United States Patent

Ta et al.

(10) Patent No.: US 9,506,539 B2
(45) Date of Patent: Nov. 29, 2016

(54) VEHICLE DOOR LOCK ACTUATOR

(71) Applicant: Johnson Electric S.A., Murten (CH)

(72) Inventors: Jing Ning Ta, Hong Kong (CN);
Zhong Ping Wu, Shenzhen (CN); Bin Yu, Shenzhen (CN); Qiu Mei Li, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 0 days.

(21) Appl. No.: 14/990,089

(22) Filed: Jan. 7, 2016

(65) Prior Publication Data

US 2016/0201773 A1 Jul. 14, 2016

(30) Foreign Application Priority Data

Jan. 9, 2015 (CN) .......................... 2015 1 0011843

(51) Int. Cl.
*F16H 19/00* (2006.01)
*E05B 81/24* (2014.01)
*E05B 81/02* (2014.01)
*E05B 81/36* (2014.01)
*F16H 35/00* (2006.01)

(52) U.S. Cl.
CPC ............. *F16H 19/001* (2013.01); *E05B 81/02* (2013.01); *E05B 81/25* (2013.01); *E05B 81/36* (2013.01); *F16H 2019/008* (2013.01); *F16H 2035/006* (2013.01)

(58) Field of Classification Search
CPC ........... F16H 19/001; F16H 2019/008; F16H 2035/006; E05B 81/25; E05B 81/36
USPC ........ 74/421 A, 439, 665 G, 665 GA, 665 F, 74/392, 400, 401, 405, 412 R, 413, 421 R; 292/112, 199, 51, 142, 172
See application file for complete search history.

(56) References Cited

U.S. PATENT DOCUMENTS

| | | | | | |
|---|---|---|---|---|---|
| 2,823,561 | A | * | 2/1958 | Opocensky | G04B 1/205 192/138 |
| 3,768,325 | A | * | 10/1973 | Kucharski, Jr. | F16D 71/00 338/DIG. 1 |
| 5,161,508 | A | * | 11/1992 | Zentgraf | B60K 26/04 123/339.25 |
| 5,949,206 | A | * | 9/1999 | Oruganty | B60S 1/08 15/250.001 |
| 6,007,117 | A | | 12/1999 | Spindler | |

FOREIGN PATENT DOCUMENTS

| DE | EP 1520736 A2 * | 4/2005 | ............ B60H 1/0065 |
|---|---|---|---|
| JP | WO 2008117779 A1 * | 10/2008 | ................ F16F 9/12 |

* cited by examiner

*Primary Examiner* — William Kelleher
*Assistant Examiner* — Bobby Rushing, Jr.
(74) *Attorney, Agent, or Firm* — Muncy, Geissler, Olds & Lowe, P.C.

(57) ABSTRACT

An actuator for a vehicle door lock mechanism has a motor, a first gear, a second gear and a third gear. The motor has a shaft to which the first gear is connected. The motor rotates the first gear, which in turn drives the second gear and the third gear. A non-tooth part is formed on the second gear. A projection is formed on the third gear. Stops are arranged for stopping rotation of the third gear. When the second gear rotates to a position where the non-tooth part corresponds to the third gear, the projection is spaced from one stop by an angle. When the second gear rotates further, the gears re-mesh and the third gear rotates till the projection contacts the stop.

20 Claims, 3 Drawing Sheets

VEHICLE DOOR LOCK ACTUATOR

CROSS REFERENCE TO RELATED APPLICATIONS

This non-provisional patent application claims priority under 35 U.S.C. §119(a) from Patent Application No. 201510011843.6 filed in The People's Republic of China on Jan. 9, 2015, the entire contents of which are hereby incorporated by reference.

FIELD OF THE INVENTION

This invention relates to a vehicle door lock actuator and in particular, to a door lock actuator mechanism having a double lock feature.

BACKGROUND OF THE INVENTION

Electric door locks for vehicles are commonly used to prevent unauthorized entry and such locks can be centrally activated. Recently, door locks with a second locking position have been used to prevent the lock from being opened by the internal handles, thus preventing the door from being opened, even if the window has been broken to gain access to the vehicle. Such locking mechanisms are known as a door double lock.

Known vehicle door double lock systems usually includes a controller, an actuator, a lock body, an inner handle and an outer handle. The handles are pivotably connected to the lock body by virtue of connecting rods. The controller sends a corresponding control signal to the actuator according to a received unlocking, central lock or double lock command, and the actuator executes a corresponding action according to the received signal to disconnect or connect the inner handle and the outer handle to the lock body, so that locking or unlocking is achieved. The known actuator is driven by two motors to achieve central (single) lock and double lock functions, which makes the actuator have a large size, complex structure and high cost.

SUMMARY OF THE INVENTION

Hence there is a desire for an actuator for a vehicle door double lock system and its driving mechanism which has a simple and compact structure and low cost.

Accordingly, in one aspect thereof, the present invention provides a driving mechanism of an actuator for a vehicle door double lock system, comprising: a motor having a shaft; a first gear fixed to the shaft to rotate with the shaft; a second gear meshed with the first gear, the second gear comprising a non-tooth part formed thereon; a third gear meshed with the second gear, the third gear being rotatable between a first position, a second position and a third position; a projection formed on the third gear and rotates with the third gear; a first stop arranged on a rotation path of the projection for cooperating with the projection to stop rotation of the third gear; wherein the motor is configured to rotate the first gear, which in turn rotates the second gear, which in turn drives the third gear; and when the second gear rotates to a position where the non-tooth part of the second gear corresponds to the third gear, the third gear is in the second position and the projection is spaced from the first stop by an angle, and when the second gear continues rotating to a position where the non-tooth part of the second gear is completely separated from the third gear, the second gear is re-meshed with the third gear and drives the third gear to rotate until the third gear is in the third position and the projection on the third gear is in contact with the first stop.

Preferably, the non-tooth part of the second gear includes a convex smooth arc surface.

Preferably, a protruding part is formed on the third gear, a radial outer surface of the protruding part has a concave smooth arc surface that matches the non-tooth part of the second gear, and a length of the protruding part is less than the length of the non-tooth part, and when the second gear rotates to a position where the non-tooth part of the second gear is in contact with the third gear, the protruding part of the third gear is in contact with the non-tooth part of the second gear, and the second gear and the third gear form a sliding contact.

Preferably, the diameter of the first gear is less than the diameter of the second gear.

Preferably, the shaft of the motor has a D-shaped cross section which is engaged in a D-shaped hole of the first gear.

Preferably, a second stop is provided which cooperates with the projection to stop rotation of the third gear when the third gear reaches the first position when rotating from the second position to the first position.

Preferably, the two stops are symmetrically arranged on two sides of the third gear, and the projection is positioned between the two stops and rotates with the third gear between the two stops.

Preferably, a distal end of each stop extends to above the third gear and is parallel to the third gear with a gap formed there between, and the gap between each stop and the third gear is less than a height of the projection.

Preferably, the projection is integrally formed on the third gear.

Preferably, the projection is sector-shaped.

According to a second aspect, the present invention provides an actuator for a vehicle door double lock system, comprising: an operating mechanism connected with a lock body; a latching mechanism; and a driving mechanism according to the first aspect of the present invention, that drives the operating mechanism and the latching mechanism, wherein when the third gear is moved to the second position, the driving mechanism drives the operating mechanism to a lock position, and when the third gear is moved to the third position the driving mechanism drives the latching mechanism to latch the operating mechanism in the locked position.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
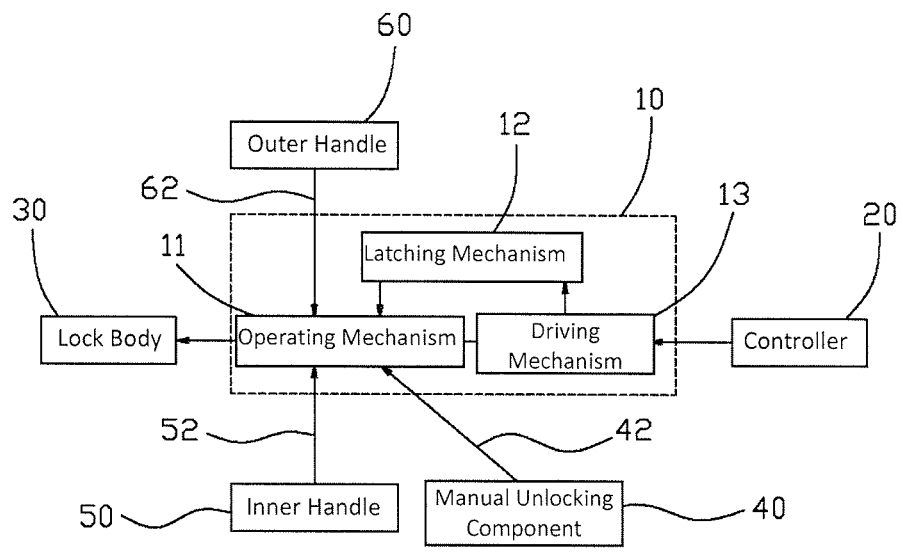
FIG. 1 is a block diagram showing the structure of a vehicle door double lock system utilizing an actuator according to the present invention.

FIG. 1 illustrates an actuator 10 for a vehicle door double lock system, in accordance with the preferred embodiment of the present invention, used for locking a door of a vehicle. The actuator 10 cooperates with a controller 20, a lock body 30, a manual unlocking component 40, an inner handle 50 arranged inside a vehicle door and an outer handle 60 arranged outside a vehicle door, to form the vehicle door double lock system, to unlock, central lock and double lock the door.

The actuator 10 comprises an operating mechanism 11, a latching mechanism 12 and a driving mechanism 13. The operating mechanism 11 is connected with the lock body 30. The manual unlocking component 40, the inner handle 50 and the outer handle 60 are pivotably connected with the operating mechanism 11 through an unlocking pull rod 42, an inside-opening pull rod 52 and an outside-opening pull rod 62, respectively. The driving mechanism 13 is connected with the controller 20 and drives the operating mechanism 11 or the latching mechanism 12 to move according to a command from the controller 20. Specifically, in an unlocked state, the operating mechanism 11 is disposed at a first position where the operating mechanism 11 is connected with both of the inside-opening pull rod 52 and the outside-opening pull rod 62. At this moment, the lock body 30 can be opened by operating either of the inner handle 50 and the outer handle 60, that is, the vehicle door can be opened by operating the inner handle 50 and the outer handle 60. When the controller 20 sends a central locking command, the driving mechanism 13 drives the operating mechanism 11 to move from the first position to a second position where the inside-opening pull rod 52 and the outside-opening pull rod 62 are disconnected with the operating mechanism 11, so that the vehicle door cannot be opened by operating the inner handle 50 and the outer handle 60, and the central locking is thus achieved. When the controller 20 sends a double locking command, the driving mechanism 13 drives the latching mechanism 12 to latch the operating mechanism 11 at the second position after the central locking is achieved.

When the central locking is achieved, unlocking can be achieved in an electric control manner or in a manual manner. In achieving the unlocking in the electric control manner, the controller 20 sends an unlocking command, and the driving mechanism 13 drives the operating mechanism 11 to reversely move back to the first position, so that the connection of the operating mechanism 11 with the inside-opening pull rod 52 and the outside-opening pull rod 62 is restored. In achieving the unlocking in the manual manner, the manual unlocking component 40 is pressed down, and the unlocking pull rod 42 that is connected with the manual unlocking component 40 drives the operating mechanism 11 to reset to the first position, so that the connection of the operating mechanism 11 with the inside-opening pull rod 52 and the outside-opening pull rod 62 is restored. In some vehicle models, the manual unlocking component 40 is a pull pin (also called as a door lifting rod), and lifting the pull pin up can drive the operating mechanism 11 to reset. In some other vehicle models, the manual unlocking component 40 is integrated with the inner handle 50. In the central lock state, double-pulling the inner handle 50 can reset and unlock the operating mechanism 11. In the double lock state, the operating mechanism 11 is latched at the second position by the latching mechanism 12 and cannot reset under the driving of the unlocking pull rod 42, so that the manual unlocking component 40 is disabled, and the unlocking can be achieved only in the electric control manner or by a key from the outside of the vehicle.

Figure 2:
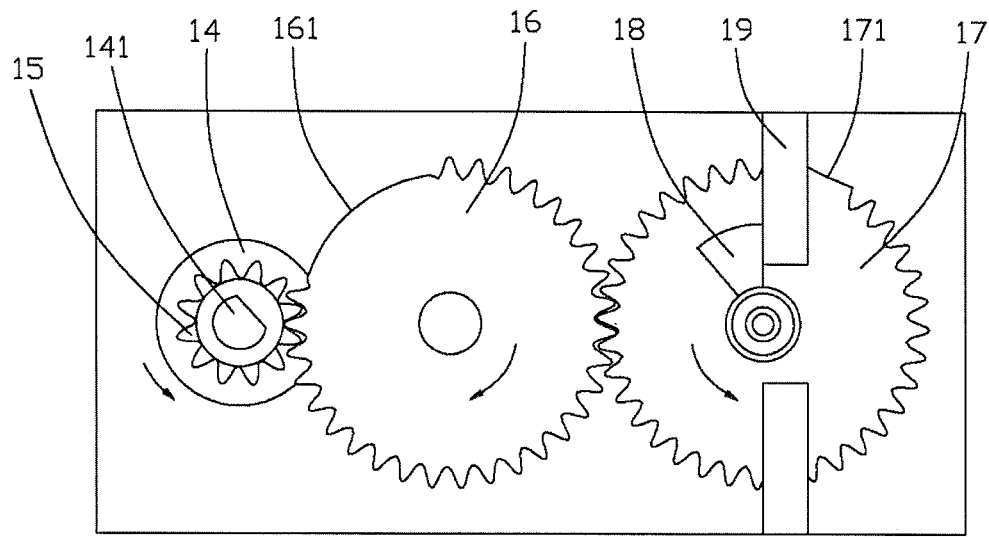
FIG. 2 is a schematic diagram of a driving mechanism of the actuator in an unlocked state.

As shown in FIG. 2, the driving mechanism 13 of the actuator 10 of the preferred embodiment has a motor 14, a first gear 15, a second gear 16 and a third gear 17. The motor 14 is connected with the controller 20 and starts or stops according to a command from the controller 20. The motor 14 is provided with a shaft 141, and the first gear 15 is fixedly connected with the shaft 141 and is sequentially meshed with the second gear 16 and the third gear 17. Preferably, the shaft 141 has a D-shaped cross section which is engaged in a D-shaped hole of the first gear 15, so that the relative rotation between the first gear 15 and the shaft 141 can be effectively avoided. The third gear 17 is connected with the operating mechanism 11 and the latching mechanism 12. When the motor 14 starts according to the command from the controller 20, the motor rotates the first gear 15, which rotates the second gear 16, which in turn rotates the third gear 17 to drive the operating mechanism 11 and the latching mechanism 12, thereby locking or unlocking the vehicle door.

In this embodiment, the first gear 15, the second gear 16 and the third gear 17 are spur gears and are arranged side by side. The diameter of the first gear 15 is far less than the diameter of the second gear 16, and the diameter of the third gear 17 is approximately equal to the diameter of the second gear 16. The first gear 15 adopts a complete gear structure, with teeth uniformly formed on its whole outer periphery. An arc-shaped non-tooth part 161 is formed on the outer periphery of the second gear 161. When the second gear 16 rotates to a position where the non-tooth part 161 of the second gear 16 is in contact with the third gear 17, the second gear 16 idles and does not drive the third gear 17 to rotate along with the second gear 16. Preferably, a convex arc surface is formed on the non-tooth part 161 of the second gear 16, and a protruding part 171 corresponding to the non-tooth part 161 is arranged on the outer periphery of the third gear 17. A radial outer surface of the protruding part 171 is a concave smooth arc surface that matches the non-tooth part 161. A circumferential length of the protruding part 171 is far less than that of the non-tooth part 161, so that the second gear 16 can be reliably re-meshed with the third gear 17 to drive the third gear 17 to continue rotating after the non-tooth part 161 of the second gear 16 is completely separated from the third gear 17. The second and third gears are arranged such that the protruding part 171 confronts the non-tooth part 161 when the second gear disengages from the third gear and the protruding part 171 slides along the non-tooth part 161 as the second gear continues to rotate, preventing the third gear from rotating until the teeth of the second gear again engage with teeth of the third gear.

Figure 5:
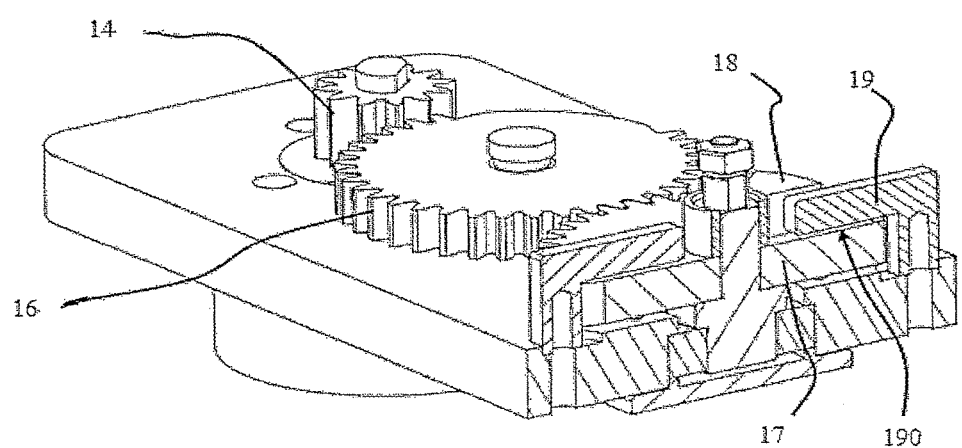
FIG. 5 is a cut-off view of the driving mechanism of the actuator.

A projection 18 is formed on the third gear 17 and rotates with the third gear 17. In this embodiment, the projection 18 is sector-shaped and cooperates with fixed stop 19 to limit the rotation of the third gear 17. The stops 19 are located on a rotation path of the projection 18. When the projection 18 rotates with the third gear 17 to be in contact with one of the stops 19, the third gear 17 stops rotating due to the contact with the stop 19. In this embodiment, there are two such stops 19 that are symmetrically arranged on two sides of the third gear 17, and a central angle between the two stops 19 is 180 degrees. Referring to FIG. 5, a distal end of each stop 19 extends to above the third gear 17 and is parallel to the third gear with a gap formed there between. The gap 190 is less than the height of the projection 18, so that the stops 19 can positively contact and block the projection 18, without friction between the rotating third gear 17 and the stops 19.

In the following, operation of the driving mechanism 13 of the actuator 10 for the vehicle door double lock system of the present invention is described in detail, by taking the example of a motor 14 which rotates counterclockwise to drive the operating mechanism 11 to arrive at a locking position.

As shown in FIG. 2, in an unlocked state, the first gear 15, the second gear 16 and the third gear 17 are sequentially meshed. The non-tooth part 161 of the second gear 16 is located on a front side of a meshing position of the second gear 16 and the first gear 15. The projection 18 on the third gear 17 is in contact with one of the stops 19 and is spaced from the other stop 19. The stop 19 in contact with the projection 18 is located on a back side of a meshing position of the second gear 16 and the third gear 17, and the spaced stop 19 is located on a front side of the meshing position of the second gear 16 and the third gear 17. When the controller 10 sends a central locking command, the motor 14 rotates counterclockwise to drive the first gear 15 to rotate counterclockwise, the second gear 16 rotates clockwise and the third gear 17 rotates counterclockwise. The projection 18 rotates counterclockwise with the third gear 17. The diameter of the first gear 15 is far less than the diameter of the second gear 16 and the diameter of the third gear 17 and, therefore, the rotational speed of the second gear 16 and the third gear 17 are far less than the rotational speed of the first gear 15 and the motor 14. Therefore, the high rotational speed of the motor 14 is converted into a lower rotational speed which is outputted to the operating mechanism 11 and the latching mechanism 12.

Figure 3:
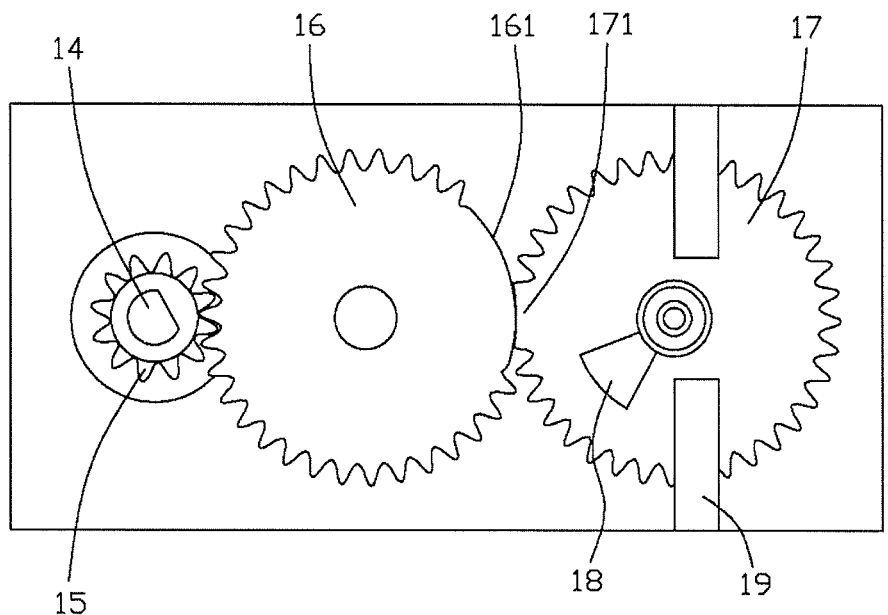
FIG. 3 is a schematic diagram of the driving mechanism in a central lock state.

In the foregoing rotation process, with the non-tooth part 161 of the second gear 16 rotating towards the meshing position of the second gear 16 with the third gear 17, the projection 18 on the third gear 17 is approaching the spaced front-side stop 19. As shown in FIG. 3, when the second gear 16 rotates over a preset angle (such as 10 degrees) bringing the non-tooth part 161 of the second gear 16 into contact with the third gear 17, the operating mechanism 11 moves from the first position to the second position, so that central locking is achieved, and the motor 14 is then powered off. Due to inertia, after being powered off, the motor 14 continues rotating for a very short period of time to continuously drive the second gear 16 to rotate. Because the non-tooth part 161 of the second gear 16 corresponds to the third gear 17, the further rotation of the second gear 16 puts it into an idle state, and the third gear 17 does not rotate to avoid activating double lock, thereby ensuring the accuracy of the actuator 10. Furthermore, after the third gear 17 stops rotating, the second gear 16 continues rotating by a small angle under the inertia action of the motor 14, so that a corresponding position of the second gear 16 and the third gear 17 is deviated from an edge of the non-tooth part 161 by a certain distance, and no teeth of the second gear 16 and the third gear 17 are meshed. At this time, even if the third gear 17 rotates reversely, the third gear 17 cannot drive the second gear 16 to rotate. Thus, the actuator 10 is self-locked, thereby preventing the reset of the actuator 10 caused by reverse rotation due to external factors such as vehicle body vibration or collision and hence improving the reliability and security of the door lock.

In a process of converting the unlocked state into the central lock state, the angle of rotation of the third gear 17 is less than the angle between the two stops 19, the projection 18 is not in contact with the front-side stop 19 after being separated from the back-side stop 19, and the third gear 17 does not make contact with the stops 19 in the whole rotation process. Preferably, in the central lock state, the third gear 17 rotates to a position where the protruding part 171 of the third gear 17 is in contact with the non-tooth part 161 of the second gear 16, and the matched concave and convex arc surfaces of the third gear 17 and the second gear 16 make the rotation of the second gear 16 more stable and with appropriate design can prevent the third gear from rotating. The protruding part 171 of the third gear 17 is close to the projection 18 and is located on the back side of the projection 18. In the central lock state, the projection 18 is located between the front-side stop 19 and the protruding part 171 and is spaced from the front-side stop 19 by a certain angle (such as 40 degrees).

Figure 4:
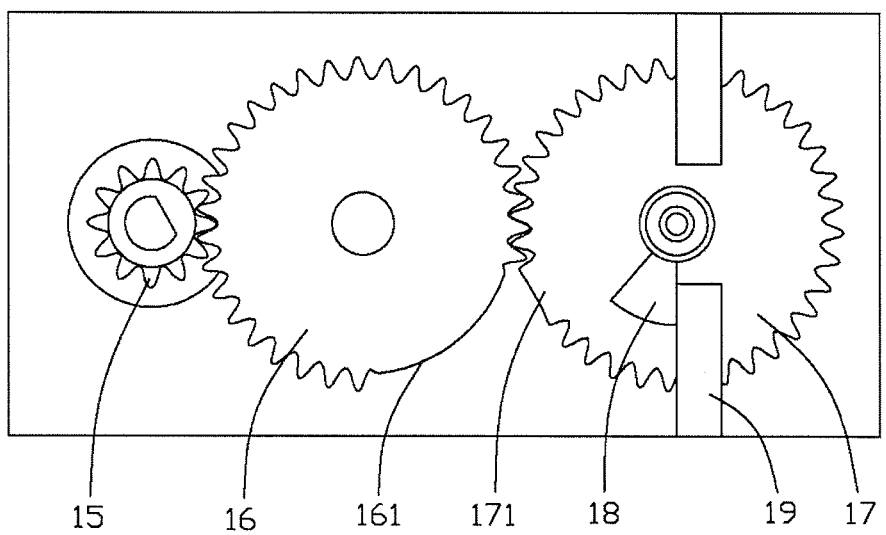
FIG. 4 is a schematic diagram of the driving mechanism in a double lock state.

When the controller 20 sends a double lock command, the driving mechanism 13 drives the operating mechanism 11 to move to the second position where the central lock state is achieved. Afterwards, as shown in FIG. 4, the motor 14 continues rotating such that the non-tooth part 161 of the second gear 16 completely rotates through a contact position of the third gear 17 and the second gear 16, and the non-tooth part 161 is completely separated from the third gear 17. As a result, the second gear 16 is re-meshed with the third gear 17 and drives the third gear 17 to rotate a preset angle (such as 40 degrees) along with the second gear 16, till the projection 18 on the third gear 17 makes contact with the front-side stop 19. In this case, the third gear 17 rotates to drive the latching mechanism 12 to move and latch the operating mechanism 11 at the second position, so that the double lock is achieved, and the motor 14 is then powered off. Due to the arrangement of the projection 18 and the stops 19, upon the projection 18 contacting the stop 19, the third gear 17 stops rotating and counteracts to the second gear 16 and the first gear 15, thereby ensuring the precision of the rotational angle of the third gear 17 and hence the accuracy of the actuator 10.

Because of the non-tooth part 161 formed on the second gear 16, the second gear 16 arrives at a double lock position after the non-tooth part 161 of the second gear 16 rotates through the contacting position of the third gear 17 and the second gear 16. At this moment, if the third gear 17 reversely rotates to drive the second gear 16 to reversely rotate a small angle, such that the non-tooth part 161 of the second gear 16 reversely rotates to correspond to the third gear 17, the second gear 16 and the third gear 17 are brought into sliding contact with each other and, as a result, the reverse rotation of the third gear 17 cannot drive the second gear 16 to continue rotating. Therefore, the actuator 10 is self-locked, thereby preventing the unlocking due to unexpected vibration and ensuring the reliability and security of the door lock. In the foregoing central lock or double lock process, because the size of the second gear 16 is far greater than the size of the first gear 15, the non-tooth part 161 of the second gear 16 does not rotate to the meshing position between the second gear 16 and the first gear 15 during rotation of the second gear 16, which ensures that the first gear 15 can continuously drive the second gear 16 and does not idle.

If unlocking needs to be performed in the central lock state and the double lock state, an unlocking command is input, and the motor 14 rotates reversely i.e. clockwise, to drive the second gear 16 to rotate counterclockwise. Due to the active reverse rotation of the second gear 16, the second gear 16 and the third gear 17 are re-meshed to drive the third gear 17 to rotate clockwise to return to the state shown in FIG. 1, which drives the latching mechanism 12 and the operating mechanism 11 to unlock the door lock.

As can be seen from the above description, the driving mechanism 13 of the actuator 10 for the vehicle door double lock system of the present invention employs a single motor 14 to drive the gears to rotate different angles to achieve the central lock state and the double lock state, respectively. Thus, the actuator 10 has a simple structure and the cost is effectively reduced. In addition, the non-tooth part 161 is formed on the second gear 16, so that the actuator 10 can be self-locked, which effectively avoids the reset caused by reverse-rotation after the door is locked and ensures the reliability of the door lock. Moreover, the projection 18 and the stops 19 provide a mechanical position limit, which ensures the rotational accuracy of the gears and hence the accuracy of the actuator 10.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

For example, while the embodiment discloses one projection and two stops, the same result could be achieved using two projections and one stop, or a single projection and a single stop appropriately arranged and sized.

The invention claimed is:

1. A driving mechanism of an actuator for a vehicle door double lock system, comprising:
    a motor having a shaft;
    a first gear fixed to the shaft to rotate with the shaft;
    a second gear meshed with the first gear, the second gear comprising a non-tooth part formed thereon;
    a third gear meshed with the second gear, the third gear being rotatable between a first position, a second position and a third position;
    a projection formed on the third gear and rotates with the third gear;
    a first stop arranged on a rotation path of the projection for cooperating with the projection to stop rotation of the third gear;
    wherein the motor is configured to rotate the first gear, which in turn rotates the second gear, which in turn drives the third gear; and
    when the second gear rotates to a position where the non-tooth part of the second gear corresponds to the third gear, the third gear is in the second position and the projection is spaced from the first stop by an angle, and when the second gear continues rotating to a position where the non-tooth part of the second gear is completely separated from the third gear, the second gear is re-meshed with the third gear and drives the third gear to rotate until the third gear is in the third position and the projection on the third gear is in contact with the first stop.

2. The driving mechanism of claim 1, wherein the non-tooth part of the second gear includes a convex smooth arc surface.

3. The driving mechanism of claim 2, wherein a protruding part is formed on the third gear, a radial outer surface of the protruding part has a concave smooth arc surface that matches the non-tooth part of the second gear, and a circumferential length of the protruding part is less than a circumferential length of the non-tooth part, and when the second gear rotates to a position where the non-tooth part of the second gear is in contact with the third gear, the protruding part of the third gear is in contact with the non-tooth part of the second gear, and the second gear and the third gear form a sliding contact.

4. The driving mechanism of claim 1, wherein the diameter of the first gear is less than the diameter of the second gear.

5. The driving mechanism of claim 1, wherein the shaft of the motor has a D-shaped cross section which is engaged in a D-shaped hole of the first gear.

6. The driving mechanism of claim 1, further comprising a second stop arranged to cooperate with the projection to stop rotation of the third gear when the third gear reaches the first position when rotating from the second position to the first position.

7. The driving mechanism of claim 6, wherein the two stops are symmetrically arranged on two sides of the third gear, and the projection is positioned between the two stops and rotates with the third gear between the two stops.

8. The driving mechanism of claim 7, wherein a distal end of each stop extends above the third gear and is parallel to the third gear with a gap formed therebetween, and the gap between each stop and the third gear is less than a height of the projection.

9. The driving mechanism of claim 1, wherein the projection is integrally formed on the third gear.

10. The driving mechanism of claim 1, wherein the projection is sector-shaped.

11. An actuator for a vehicle door double lock system, comprising:
    an operating mechanism connected with a lock body;
    a latching mechanism; and
    a driving mechanism that drives the operating mechanism and the latching mechanism, the driving mechanism comprising:
    a motor having a shaft,
    a first gear fixed to the shaft to rotate with the shaft,
    a second gear meshed with the first gear, the second gear comprising a non-tooth part formed thereon;
    a third gear meshed with the second gear, the third gear being rotatable between a first position, a second position and a third position;
    a projection formed on the third gear and rotates with the third gear
    a first stop arranged on a rotation path of the projection for cooperating with the projection to stop rotation of the third gear;
    wherein the motor is configured to rotate the first gear, which in turn rotates the second gear, which in turn drives the third gear; and
    when the second gear rotates to a position where the non-tooth part of the second gear corresponds to the third gear, the third gear is moved to the second position, the projection is spaced from the first stop by an angle and the driving mechanism drives the operating mechanism to a lock position, and when the second gear continues rotating to a position where the non-tooth part of the second gear is completely separated from the third gear, the second gear is re-meshed with the third gear and drives the third gear to the third position and the projection on the third gear is in contact with the first stop, and the driving mechanism drives the latching mechanism to latch the operating mechanism in the locked position.

12. The actuator of claim 11, wherein the non-tooth part of the second gear includes a convex smooth arc surface.

13. The actuator of claim 12, wherein a protruding part is formed on the third gear, a radial outer surface of the protruding part has a concave smooth arc surface that matches the non-tooth part of the second gear, and a circumferential length of the protruding part is less than a circumferential length of the non-tooth part, when the second gear rotates to a position where the non-tooth part of the second gear is in contact with the third gear, the protruding part of the third gear is in contact with the non-tooth part of the second gear, and the second gear and the third gear form a sliding contact.

14. The actuator of claim 11, wherein the diameter of the first gear is less than the diameter of the second gear.

15. The actuator of claim 11, wherein the shaft of the motor has a D-shaped cross section which is engaged in a D-shaped hole of the first gear.

16. The actuator of claim 11, further comprising a second stop arranged to cooperate with the projection to stop rotation of the third gear when the third gear reaches the first position when rotating from the second position to the first position.

17. The actuator of claim 16, wherein the two stops are symmetrically arranged on two sides of the third gear, and the projection is positioned between the two stops and rotates with the third gear between the two stops.

18. The actuator of claim 17, wherein a distal end of each stop extends above the third gear and is parallel to the third gear with a gap formed therebetween, and the gap between each stop and the third gear is less than a height of the projection.

19. The actuator of claim 11, wherein the projection is integrally formed on the third gear.

20. The actuator of claim 11, wherein the projection is sector-shaped.

* * * * *